United States Patent
Hazama et al.

(10) Patent No.: US 12,102,601 B2
(45) Date of Patent: Oct. 1, 2024

(54) VISCOUS LIQUID SUPPLY APPARATUS

(71) Applicant: QUALICAPS CO., LTD., Yamatokoriyama (JP)

(72) Inventors: Kazuhiro Hazama, Yamatokoriyama (JP); Kenichi Kasai, Yamatokoriyama (JP)

(73) Assignee: QUALICAPS CO., LTD., Yamatokoriyama (JP)

( * ) Notice: Subject to any disclaimer, the term of this patent is extended or adjusted under 35 U.S.C. 154(b) by 221 days.

(21) Appl. No.: 17/790,506

(22) PCT Filed: Dec. 25, 2020

(86) PCT No.: PCT/JP2020/048656
§ 371 (c)(1),
(2) Date: Jul. 1, 2022

(87) PCT Pub. No.: WO2021/153126
PCT Pub. Date: Aug. 5, 2021

(65) Prior Publication Data
US 2023/0048257 A1    Feb. 16, 2023

(30) Foreign Application Priority Data
Jan. 30, 2020    (JP) ................. 2020-013750

(51) Int. Cl.
*A61J 3/07*         (2006.01)
*B01F 23/47*        (2022.01)
(Continued)

(52) U.S. Cl.
CPC ............. *A61J 3/072* (2013.01); *B01F 23/47* (2022.01); *B01F 27/91* (2022.01); *G01N 11/14* (2013.01)

(58) Field of Classification Search
CPC .......... A61J 3/072; B01F 23/47; B01F 27/91; G01N 11/14
(Continued)

(56) References Cited

U.S. PATENT DOCUMENTS

| | | | | |
|---|---|---|---|---|
| 2,267,317 A | * | 12/1941 | Veenschoten | G01N 11/14 73/54.32 |
| 2,382,979 A | * | 8/1945 | Demb | G01N 11/14 73/54.32 |
| 3,727,452 A | | 4/1973 | Kenyon | |

(Continued)

FOREIGN PATENT DOCUMENTS

| | | |
|---|---|---|
| JP | S48-29480 A | 4/1973 |
| JP | S55-93049 A | 7/1980 |

(Continued)

*Primary Examiner* — Paul R Durand
*Assistant Examiner* — Michael J. Melaragno
(74) *Attorney, Agent, or Firm* — Muncy, Geissler, Olds & Lowe, P.C.

(57) ABSTRACT

A viscous liquid supply apparatus includes a storage tank (10) that stores viscous liquid, and a pump (14) that supplies the viscous liquid stored in the storage tank to a use point, wherein the viscous liquid supply apparatus is configured with a viscometer (20) that measures a viscosity of the viscous liquid stored in the storage tank, and a replenishment device (30) that supplies replenishment liquid to the storage tank based on the viscosity measured with the viscometer. The viscometer (20) is a rotary type viscometer that has a rotor (23) in a cylindrical shape wherein the rotor is immersed in the viscous liquid and rotates therein, and the rotor is configured with a stirring blade that agitates the viscous liquid inside the storage tank (10).

2 Claims, 2 Drawing Sheets

(51) Int. Cl.
*B01F 27/91* (2022.01)
*G01N 11/14* (2006.01)

(58) Field of Classification Search
USPC .......................................................... 73/54.32
See application file for complete search history.

(56) References Cited

U.S. PATENT DOCUMENTS

| | | | | |
|---|---|---|---|---|
| 4,325,642 A | * | 4/1982 | Kratky | D21D 5/28 |
| | | | | 366/279 |
| 4,397,561 A | | 8/1983 | Strong | |
| 4,445,365 A | * | 5/1984 | Selby | G01N 11/14 |
| | | | | 73/54.34 |
| 4,630,468 A | * | 12/1986 | Sweet | G01N 11/14 |
| | | | | 73/54.32 |
| 5,315,864 A | * | 5/1994 | Surjaatmadja | G01N 11/14 |
| | | | | 73/54.32 |
| 5,546,791 A | * | 8/1996 | Meeten | G01N 11/14 |
| | | | | 73/54.32 |
| 5,840,108 A | | 11/1998 | Karras | |
| 5,987,970 A | * | 11/1999 | Ball | G01N 11/14 |
| | | | | 73/54.28 |
| 6,997,045 B2 | * | 2/2006 | Wallevik | B01F 35/212 |
| | | | | 73/54.38 |
| 8,794,051 B2 | * | 8/2014 | Morgan | G01N 11/14 |
| | | | | 73/54.23 |
| 2016/0349163 A1 | * | 12/2016 | Chen | G01N 11/14 |

FOREIGN PATENT DOCUMENTS

| | | |
|---|---|---|
| JP | S55-101036 A | 8/1980 |
| JP | S60-27841 A | 2/1985 |
| JP | H08-323961 A | 12/1996 |
| JP | 2010-078444 A | 4/2010 |
| WO | 2009/125485 A1 | 7/2011 |

* cited by examiner

VISCOUS LIQUID SUPPLY APPARATUS

TECHNICAL FIELD

The present invention relates to a viscous liquid supply apparatus device that supplies a viscous liquid such as a sealing liquid.

BACKGROUND

For capsules such as pharmaceuticals and foods, it has been conventionally practiced to form a band seal by using a sealing liquid at a fitting portion between a cap and a body. The sealing liquid, which is a viscous liquid, is adjusted to a desired viscosity. After that, the sealing liquid is supplied to a seal pan of the sealing machine and then applied to a capsule being conveyed (see, Patent Document 1).

PRIOR ART

Patent Document(s)

[Patent Doc. 1] Re-issued 2009/125485

SUMMARY

Problem(s) to be Solved by the Invention

However, the viscosity of the sealing liquid gradually changes due to an evaporation of water. In correspondence with this change, the quality of the seal liquid deteriorates. As a result, the adhesion (sealing property) of the fitting part may become insufficient.

Therefore, an objective of the present invention is to provide a viscous liquid supply apparatus that is capable of supplying a viscous liquid having a stable viscosity.

Means for Solving the Problem(s)

The objective of the present invention is achieved with a viscous liquid supply apparatus including a storage tank that stores viscous liquid, and a pump that supplies the viscous liquid stored in the storage tank to a use point, wherein the viscous liquid supply apparatus is configured with a viscometer that measures a viscosity of the viscous liquid stored in the storage tank, and a replenishment device that supplies replenishment liquid to the storage tank based on the viscosity measured with the viscometer. The viscometer is a rotary type viscometer that has a rotor in a cylindrical shape wherein the rotor is immersed in the viscous liquid and rotates therein, and the rotor is configured with a stirring blade that agitates the viscous liquid inside the storage tank.

In the viscous liquid supply apparatus, it is preferred that a plurality of stirring blades, which includes the stirring blade, is arranged radially from a drive shaft that rotates the rotor toward an inner peripheral surface of the rotor.

The use point may be arranged at a middle of a circulation line along which the viscous liquid stored in the storage tank is circulated to an outside of the storage tank.

The viscous liquid is preferably a sealing liquid that forms a band seal on a capsule, and may be supplied to a seal pan that is arranged at the use point.

Advantage(s) of the Invention

With the viscous liquid supply apparatus of the present invention, it is achieved to supply viscous liquid having a stable viscosity.

EMBODIMENT(S) TO CARRY OUT THE INVENTION

Figure 1:
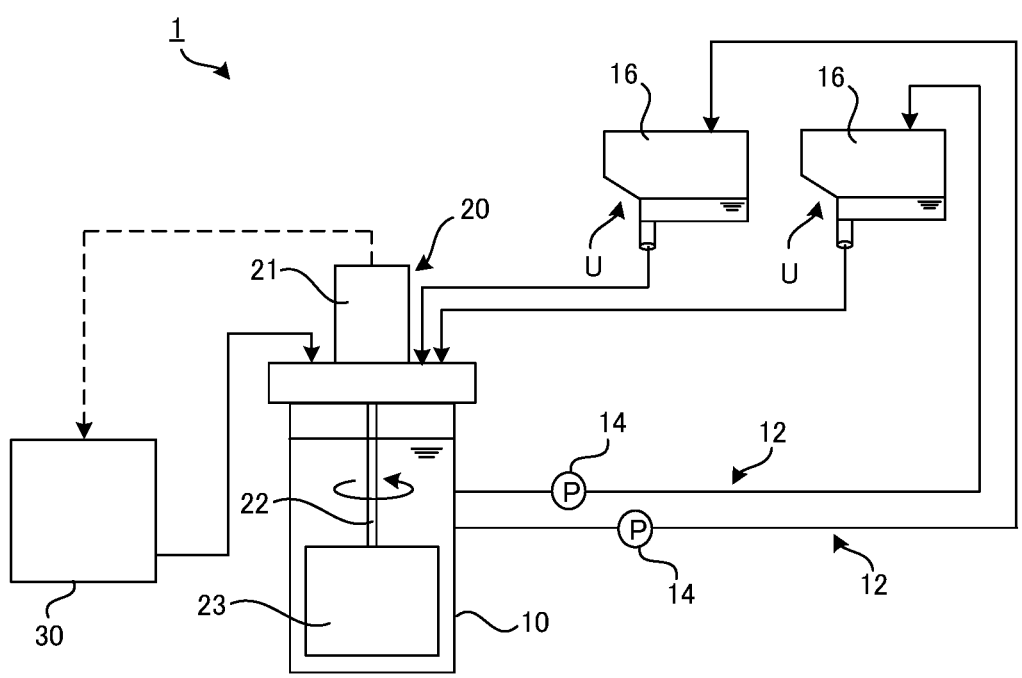
FIG. 1 is a schematic configuration diagram of a viscous liquid supply apparatus according to an embodiment of the present invention

Hereinafter, embodiments of the present invention will be explained referring to the drawings submitted together. FIG. 1 is a schematic configuration diagram of a viscous liquid supply apparatus according to an embodiment of the present invention. As shown in FIG. 1, the viscous liquid supply apparatus 1 is provided with storage tank 10 that has a cylindrical shape having a bottom to store viscous liquid, circulation line 12 along which the viscous liquid stored in storage tank 10 is circulated to the outside of storage tank 10, viscous meter 20 that measures the viscosity of the viscous liquid stored in storage tank 10, and replenishment device 30 that supplies a replenishment liquid in storage tank 10 based on the viscosity measured by viscous meter 20. And have. The viscous liquid of the present embodiment is a sealing liquid for forming a band seal on a capsule.

Circulation line 12 includes pump 14. The circulation line is configured to supply the viscous liquid to the use point U that is arranged at the middle of circulation line 12 by an operation of pump 14. At use point U, seal pan 16 that is configured to store the supplied seal liquid is provided. A band seal is formed by the rotation of a seal roller (not shown) with respect to capsules that are sequentially conveyed above seal pan 16. The sealing liquid existing inside sealing pan 16 is collected in storage tank 10 with circulation line 12. A plurality of circulation lines 12 are provided in this embodiment. Circulation line 12, however, may be single.

Viscometer 20 is provided with viscometer main body 21 arranged above the storage tank 10, drive shaft 22 that extends vertically downward from viscosity main body 21, and cylindrical rotor 23 that rotates horizontally due to the rotation of drive shaft 22. The measurement principle of viscometer 20 is the same as the measurement principle of a known rotary viscometer. Viscometer main body 21 is equipped with a drive unit, a control unit, an output unit, and the like in its housing. An upper portion of drive shaft 22 is connected to a motor that functions as a drive unit of viscometer main body 21. The control unit of viscometer main body 21 detects, in a real time, the viscous torque that the drive shaft 22 rotating at a predetermined rotation speed receives from the viscous liquid. The detected result is output from the output unit to replenishment device 30

Replenishment device 30 stores the replenishment liquid corresponding to evaporation component(s) of the viscous liquid, which has been evaporated, in a built-in tank (not shown). Replenishment device 30 is configured to control a supply amount of the replenishment liquid to the storage tank 10 based on a detection of the viscometer 20. In this embodiment, water is used as the replenishment liquid.

Figure 2:
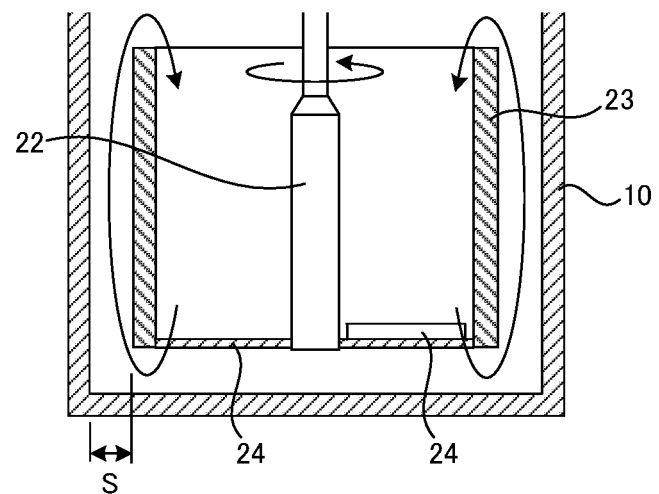
FIG. 2 is a cross-sectional diagram of a main part of the viscous liquid supply apparatus shown in FIG. 1
Figure 3:
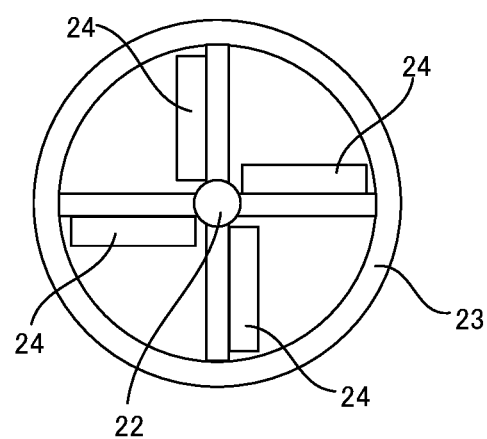
FIG. 3 is a plan view of the main part of the viscous liquid supply apparatus shown in FIG. 1.

FIG. 2 is an enlarged vertical sectional view showing the vicinity of rotor 23. FIG. 3 is a plan view of rotor 23. As shown in FIGS. 2 and 3, rotor 23 is different from a rotor that is provided in a conventional rotary viscometer, and is provided with stirring blades 24 for stirring the viscous liquid inside storage tank 10.

A plurality of stirring blades 24 are provided at a lower portion of rotor 23 having both ends open so as to radially extend from drive shaft 22 that passes through the center of rotor 23. In this embodiment, the number of stirring blades 24 is four. Rotor 23 is supported by drive shaft 22 via stirring blades 24 by tips of stirring blades 24 contacting to an inner peripheral surface of rotor 23. A tip side of each stirring blade 24 in the rotation direction is inclined diagonally upward. The rotation of rotor 23 causes the viscous liquid to swirl and ascend. As a result, the viscous liquid in storage tank 10 is agitated to make the viscosity of the viscous liquid uniform.

The diameter of rotor 23 is preferably determined according to the diameter of storage tank 10 so that the viscous liquid is agitated by stirring blade 24 entirely inside storage tank 10. For example, gap S shown in FIG. 2, which is determined between the inner peripheral surface of storage tank 10 and the outer peripheral surface of rotor 23, is preferably ranged from 2 to 10% of the radius of storage tank 10.

In viscous liquid supply apparatus 1 of the present embodiment, a water content of the viscous liquid evaporates at use point U or the like and is returned to storage tank 10. As a result, when the viscosity of the viscous liquid stored in storage tank 10 changes, viscometer 20 is configured to measure the viscosity while stirring the viscous liquid with stirring blades 24. The viscosity of the viscous liquid existing inside the storage tank 10 is accurately measured in real time. Therefore, replenishment device 30 surely maintains the viscosity of the viscous liquid within a certain range by controlling the supply amount of the replenishment liquid according to the detection of viscometer 20. As a result, the viscous liquid supply apparatus 1 achieves to supply the viscous liquid having a stable viscosity. The supply type in which replenishment liquid is supplied from replenishment device 30, may be in continuing or in batch.

The viscous liquid supplied by viscous liquid supply apparatus 1 is not limited to the sealing liquid of the present embodiment. Various viscous liquids of which viscosity changes with time due to evaporation of the contained components may be used. For example, the present invention is suitably applied to various applications such as supplying paints, inks, cosmetic liquids, and the like to the use point(s).

LEGENDS

1 Viscous liquid supply apparatus
10 Storage tank
12 Circulation line
14 Pump
16 Seal pan
20 Viscometer
22 Drive shaft
23 Rotor
24 Stirring blade
30 Replenishment device
U Use Point

What is claimed is:

1. A viscous liquid supply apparatus, comprising:
a storage tank that stores viscous liquid, and
a pump that supplies the viscous liquid stored in the storage tank to a use point, wherein
the viscous liquid supply apparatus is configured with
   a viscometer that measures a viscosity of the viscous liquid stored in the storage tank, and
   a replenishment device that supplies replenishment liquid to the storage tank based on the viscosity measured with the viscometer,
the viscometer is a rotary type viscometer that has a rotor in a cylindrical shape wherein the rotor is immersed in the viscous liquid and rotates therein,
the rotor is configured with a stirring blade that agitates the viscous liquid inside the storage tank,
the use point is arranged at a middle of a circulation line along which the viscous liquid stored in the storage tank is circulated to an outside of the storage tank,
the viscous liquid is a sealing liquid that forms a band seal on a capsule, and is supplied to a seal pan that is arranged at the use point,
the sealing liquid existing inside the sealing pan is collected in the storage tank with the circulation line, and
when the viscosity of the viscous liquid stored in the storage tank changes due to a water content of the viscous liquid being evaporated at use point, the viscometer measures the viscosity while stirring the viscous liquid with the stirring blade and the replenishment device controls the supply amount of water as the replenishment liquid according to the detection of the viscometer.

2. The viscous liquid supply apparatus according to claim 1, wherein
a plurality of stirring blades, which includes the stirring blade, is arranged radially from a drive shaft that rotates the rotor toward an inner peripheral surface of the rotor.

* * * * *